United States Patent
Zhao et al.

(10) Patent No.: US 9,815,737 B2
(45) Date of Patent: Nov. 14, 2017

(54) VACUUM GLASS COMPONENT

(75) Inventors: Yan Zhao, Henan (CN); Yanbing Li, Henan (CN); Zhangsheng Wang, Henan (CN)

(73) Assignee: LUOYANG LANDGLASS TECHNOLOGY CO., LTD, Henan (CN)

( * ) Notice: Subject to any disclaimer, the term of this patent is extended or adjusted under 35 U.S.C. 154(b) by 208 days.

(21) Appl. No.: 13/989,050

(22) PCT Filed: Jul. 13, 2011

(86) PCT No.: PCT/CN2011/077094
§ 371 (c)(1),
(2), (4) Date: Jun. 21, 2013

(87) PCT Pub. No.: WO2012/075811
PCT Pub. Date: Jun. 14, 2012

(65) Prior Publication Data
US 2014/0050867 A1    Feb. 20, 2014

(30) Foreign Application Priority Data
Dec. 10, 2010 (CN) .......................... 2010 1 0582631

(51) Int. Cl.
*E06B 3/66* (2006.01)
*E06B 3/663* (2006.01)
(Continued)

(52) U.S. Cl.
CPC ............ *C03C 27/08* (2013.01); *E06B 3/6612* (2013.01); *E06B 3/66357* (2013.01);
(Continued)

(58) Field of Classification Search
CPC .......... E06B 3/66; E06B 3/6612; E06B 3/663; E06B 3/66385; E06B 3/66357;
(Continued)

(56) References Cited

U.S. PATENT DOCUMENTS 4,132,218 A * 1/1979 Bennett ......................... 126/704
4,393,105 A * 7/1983 Kreisman ....................... 428/34
(Continued)

FOREIGN PATENT DOCUMENTS

| CN | 102079619 A | 6/2011 |
| CN | 102079631 A | 6/2011 |
| GB | 2207669 A * | 2/1989 |

*Primary Examiner* — Joanna Pleszczynska
(74) *Attorney, Agent, or Firm* — AKC Patents, LLC; Aliki K. Collins

(57) ABSTRACT

The present invention discloses a vacuum glass component, wherein the vacuum glass component is formed by compounding two or a plurality of glass plates, and the peripheries of the two or a plurality of glass plates are sealed with each other through sealing part in air-tight manner, a gap remains between the sealing part and the edge of the glass plate, vacuum-pumping is performed between adjacent glass plates at the inner side of the sealing part, and the sealing part is isolated from the outer environment between adjacent glass plates at the outer side of the sealing part by filling seal gum, resin or plastic. The vacuum glass component make the outer side of the sealing part isolated from the outer environment by using seal gum, resin or plastic, thereby preventing the metal at the sealing part from forming a heat bridge and facilitating the later installation and use of vacuum glass component. Moreover, the surface at the side edge of the vacuum glass component can be trimmed to be parallel and level by setting seal gum, resin or plastic, thereby keeping the beautiful appearance of the vacuum glass component.

12 Claims, 2 Drawing Sheets

(51) Int. Cl.
  *C03C 27/08*  (2006.01)
  *E06B 3/673*  (2006.01)
  *E06B 3/677*  (2006.01)

(52) U.S. Cl.
  CPC ........ *E06B 3/67334* (2013.01); *E06B 3/6775* (2013.01); *Y02B 80/24* (2013.01)

(58) Field of Classification Search
  CPC ....... C03C 27/08; C03B 23/20; C03B 23/203; C03B 23/24; C03B 23/245; C03B 27/06; C03B 27/062; C03B 27/065; C03B 27/067
  USPC ........... 428/34; 52/786.1, 786.13; 65/41, 43, 65/58; 156/99, 104, 109
  See application file for complete search history.

(56) References Cited

U.S. PATENT DOCUMENTS

| | | | |
|---|---|---|---|
| 7,204,102 B1* | 4/2007 | Eames | C03C 27/08 65/36 |
| 2008/0166570 A1* | 7/2008 | Cooper | 428/426 |
| 2010/0006090 A1* | 1/2010 | Palmieri | 126/704 |
| 2010/0147926 A1* | 6/2010 | Yamada et al. | 228/121 |

* cited by examiner

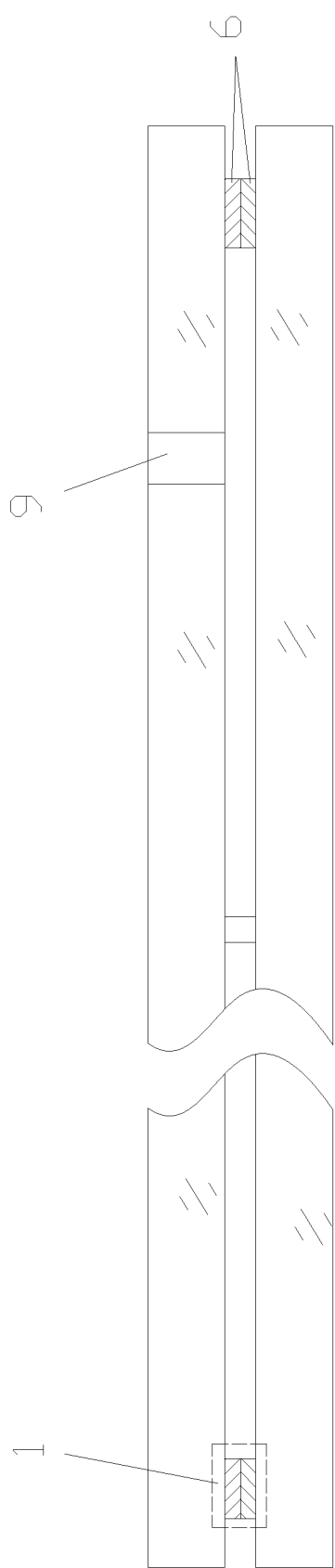
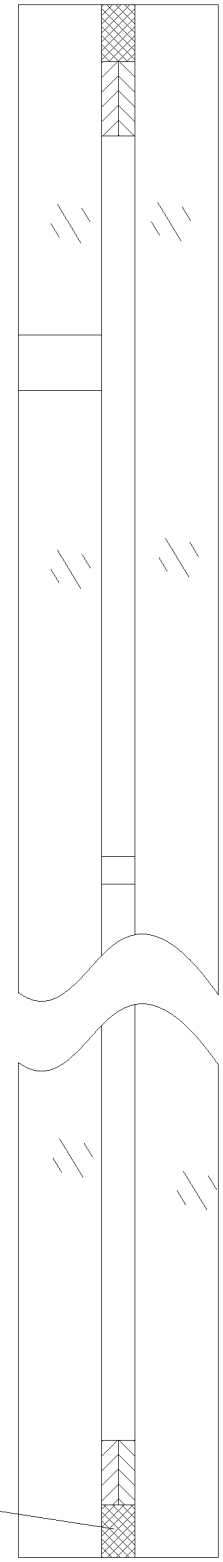
FIG. 2a
FIG. 2b

VACUUM GLASS COMPONENT

TECHNICAL FIELD

The invention relates to a vacuum glass component.

BACKGROUND ARTS

At present, vacuum glass components mainly adopt the following sealing methods: 1) the periphery of glass plate is sealed by using a glass powder with low-melting point; 2) a metal sheet is fixedly connected at the edge of the glass plate, and the periphery of the glass plate is sealed in air-tight method by mutually connecting the metal sheet extended out of the edge of the glass plate. For the first sealing method, the glass plate needs to be heated till the glass powder is melted during sealing, which results in the annealing of tempered glass plate due to such heating, thus the method cannot be used for processing tempered vacuum glass components. The vacuum glass component produced according to the second sealing method is typically disclosed in the Chinese patent application Publication CN101302081A; for such type of vacuum glass component, the metal sealing sheet at the periphery is extended out of the edge of the glass plate, the metal sealing sheet is sealed in a corresponding support structure to guarantee the beautiful appearance of the integral structure when being used later, and the metal sealing sheet is prevented from forming a heat bridge so as to realize heat insulation performance of vacuum glass component, thus such type of vacuum glass component has the defect of inconvenience in use.

TECHNICAL SOLUTIONS

Aiming at the above problem existing in the second type of vacuum glass component, the invention aims to provide a vacuum glass component, and the vacuum glass component has a structure similar to the existing insulated glass component, thereby providing convenience for later installation and use.

In order to realize the above purpose, the vacuum glass component is formed by compounding two or a plurality of glass plates, wherein the peripheries of the two or a plurality of glass plates are sealed with each other through sealing sheets in air-tight manner, a space remains between the sealing part and the edge of the glass plate, vacuum-pumping is performed between adjacent glass plates at the inner side of the sealing part, and the sealing part is isolated from the outer environment by filling seal gum, resin or plastic between adjacent glass plates at the outer side of the sealing part; wherein the preparation technology of the sealing part is as following:

1) Preparing a metallization paste coating on the surface of a part to be sealed at the edge of the glass plate, wherein the metallization paste is of high sintering type;

2) Heating the glass plate, wherein the metallization paste coating is sintered to be a metallized layers solidified together with the body of the glass plate;

3) Carrying out tempering or semi-tempering or heat strengthening treatment on the glass plate according to the existing technology;

4) Using the metal brazing technology and connecting the metallized layer of the two glass plates to be sealed by hermetic welding, or connecting the metal sealing plates by hermetic welding between the metallized layers of the two glass plates so as to realize the hermetic sealing at the edges of the two glass plates.

Further, the sintering temperature of the sintering technology in the step 2) is within the tempering temperature range of the glass plate, and the tempering treatment of the glass plate is finished by quick cooling directly after the glass plate being carried out sintering technology treatment.

Further, the sintering temperature of the high temperature type metallization paste is 560-700 Celsius.

Further, the metallization paste coating is prepared on the surface of the glass plate by dip coating, spray coating, screen printing, manual coating or mechanical coating.

Further, the metal material contained in the metallization paste has fine brazing welding performance.

Further, the metallization paste is Ag metallization paste, Cu—Ag alloy metallization paste, Ni metallization paste, Ni—Ag alloy metallization paste, Au and alloy metallization paste thereof, Zn and alloy metallization paste thereof or Pd and alloy metallization paste thereof.

Further, when in step 4), firstly, a brazing metal foil is arranged between two the metallized layers to be welded connection or between the metallized layer and the metal sealing plate, or a brazing metal is pre-plated on the surface of at least one thereof, and then the subsequent welding is finished according to metal brazing technology.

Further, the brazing metal foil and the brazing metal are made of tin alloy brazing filler metal.

Further, the metal brazing technology is carried out under the protection of inert gases, or carried out in the environment of $H_2$ gas or $N_2$ gas, or carried out in vacuum environment.

Further, the metal brazing technology is carried out by locally heating the sealing area, wherein the heating method comprises laser heating, flame heating, current heating, induction heating or microwave heating.

Further, the brazing temperature of the metal braze is lower than or equal to 350 Celsius.

Further, the side edges of the vacuum glass component are parallel and level.

The vacuum glass component in the invention is a flat plate vacuum glass component and also can be a curved vacuum glass component.

The sealing part of vacuum glass component of the present invention is formed by two metallised layer sintered on the surface of the glass plate and welded with each other, or is formed by metallised layers with the metal sealing sheet that are welded together, this sealing structure not only has the advantages of firm connection of sealing part, high air tightness, good thermal shock resistance, and the like, but also establishes conditions for the processing of tempered vacuum glass products since relatively low brazing temperature can be used to prevent tempering glass from being annealed. As the high temperature sintering type metallization paste is used in the method so that the sintered metallized layer has excellent resistance to high temperature, thus the glass plate after cooled can be heated again till tempering temperature after the metallized layer is sintered so as to finish the tempering treatment of the metallized layer, and the glass plate after sintered still at high temperature (within the range of tempering temperature) can be quickly cooled to finish the tempering treatment of the glass plate after the sintering technology is finished when the metallization paste is used in which the sintering temperature is within the range of tempering temperature of glass plate. The vacuum glass component make the outer side of the sealing part isolated from the outer environment by using seal gum, resin or plastic, thereby preventing the metal at the sealing part from forming a heat bridge and guaranteeing the insulation characteristic of the vacuum glass, also facilitating the later installation and use of vacuum glass component. Moreover, the surface at the side edge of the vacuum glass component can be trimmed to be parallel and level and setting seal gum, resin or plastic, thereby keeping the beautiful appearance of the vacuum glass component.

BRIEF DESCRIPTION OF DRAWINGS

FIG. 2 is the structural schematic diagram of the second embodiment of the present invention, wherein, In FIG. 2a, the outer side of the sealing part is not filled with seal gum, and in FIG. 2b, the outer side of the sealing part is filled with seal gum.

Figure 1A:
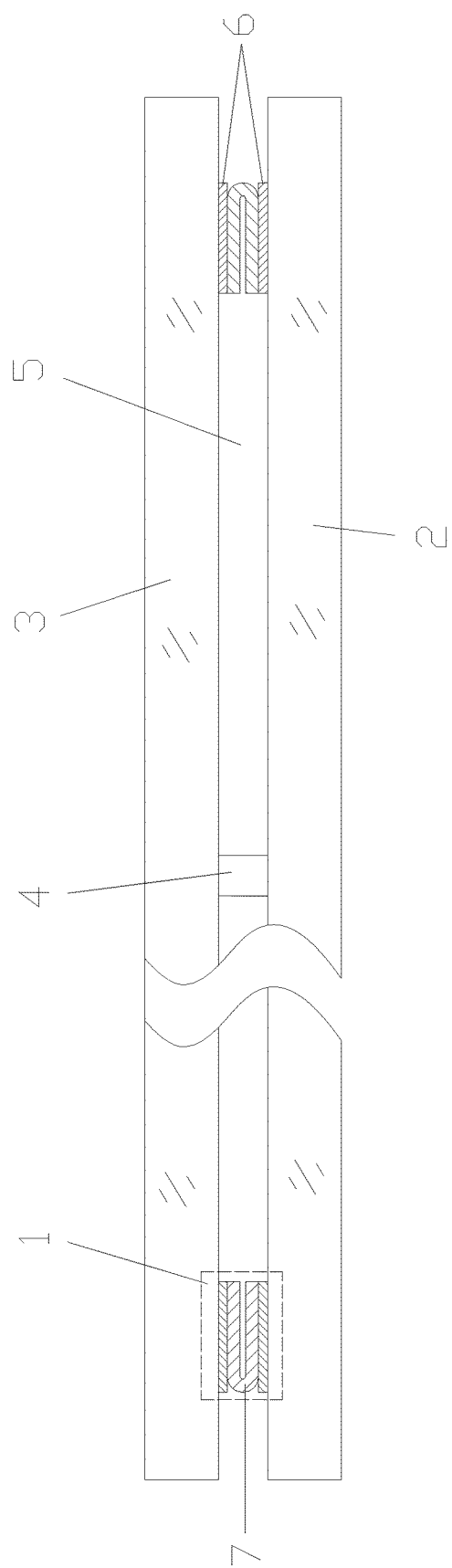
FIG. 1 is the structural schematic diagram of the first embodiment of the present invention, wherein, In FIG. 1a, the outer side of the sealing part 1 is not filled with seal gum, and in FIG. 1b, the outer side of the sealing part 1 is filled with seal gum.

In the figure, reference number 1 refers to sealing part, reference number 2 refers to bottom glass plate, reference number 3 refers to top glass plate, reference number 4 refers to middle support, reference number 5 refers to vacuum space, reference number 6 refers to metallized layer at the surface of the glass plate, reference number 7 refers to metal sealing sheet having a U-shaped cross-section, reference number 8 refers to seal gum, and reference number 9 refers to pumping hole.

DETAILED DESCRIPTION

The present invention is described in detail in connection with the following associative accompanying diagrams.

Figure 1B:
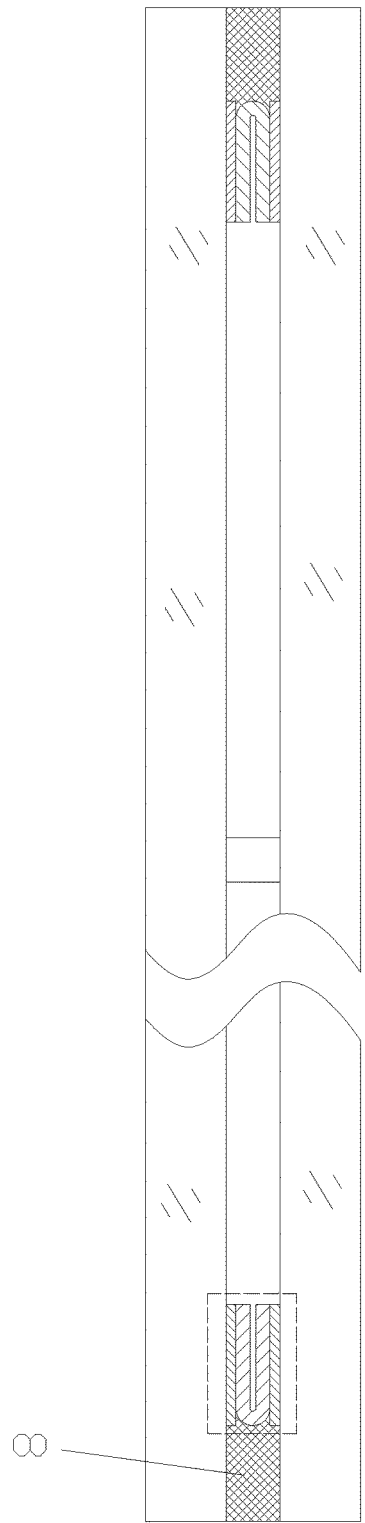

In the first embodiment shown in the FIG. 1, shown as FIG. 1a and FIG. 1b, the vacuum glass component is formed by compounding the bottom glass plate 2 and the top glass plate 3, and the sealing part 1 at the periphery of the top and the bottom glass plate 2, 3 is formed by the metallized layer 6 fixedly bonded at the surface of the glass plate and the metal sealing sheet 7 having a U-shaped cross-section, both side edges of the metal sealing sheet 7 and the metallized layer 6 on the top and the bottom glass plates are welded and connected in air-tight manner through metal braze welding technology, a gap remains between the sealing part 1 and the edge of the glass plate, the vacuum space 5 is between the top and the bottom glass plates 2, 3 at the inner side of the sealing part 1. The seal gum, resin or plastic 8 is filled between the top and the bottom glass plates 2, 3 at the outer side of the sealing part 1, the sealing part 1 is isolated from the outer environment, and the surface at the side edge of the vacuum glass component is leveled.

The process steps of glass plate 2, 3 sealed by using the sealing part 1 are as following: first, preparing a metallization paste coating at the surface of a part to be sealed at the edge of the glass plate 2 and the glass plate 3; then, heating the glass plate, wherein the metallization paste coating is sintered to be a metallized layer 6 solidified together with the glass plate; then, carrying out tempering or semi-tempering or heat strengthening to the glass plate according to the existing technology; then, composing the two glass plates 2, 3 to be sealed, arranging the metal sealing sheet 7 with a U-shaped cross section between the two metallized layer 6 mutually corresponding to the two glass plates 2, 3 so that the two sides of the metal sealing sheet 7 are respectively opposite to the metallized layer 6 on the top and the bottom glass plates and the metal brazing solder is installed between the sides of the metal sealing sheet 7 and the metallized layer 6; finally, using the metal brazing technology, and connecting the two sides of the metal sealing sheet 7 with the corresponding metallized layer 6 by hermetic welding so as to realize the hermetic sealing at the edges of the two glass plates 2, 3.

The metallization paste coating can be prepared on the surface of the glass plate by dip coating, spray coating, screen printing, manual coating or mechanical coating.

When the metallization paste coating is sintered, the sintering can be finished by heating the glass plate completely and also can be finished by locally heating the coating part, wherein the heating method can be laser heating, flame heating, current heating, induction heating or microwave heating, and the like.

When the metal brazing solder is installed between the sides of the metal sealing sheet 7 and the metallized layer 6 on the glass plates 2, 3, the brazing solder can be processed into a metal foil and then the metal foil is arranged between the metal sealing sheet 7 and the metallized layer 6, and also the brazing solder is metallically pre-plated on the sides of the metal sheet 7, and/or pre-plated on the surface of the metallized layer 6, and then the subsequent welding is finished according to the metal brazing technology.

Tin alloy solder is used as brazing solder, and the advantage is that a relatively low welding temperature (generally no more than 250 Celsius) can be used in welding, thereby being capable of preventing the braze welding temperature from influencing the performance of glass plate. Especially for the processing of tempering composite glass, the glass plate is under tempered state before braze welding, thus the braze welding temperature is controlled to be no more than 350 Celsius so as to prevent the tempered glass plate from being annealed in braze welding process. Similarly, for the glass plate in semi-tempering state or after heat strengthening before braze welding, the braze welding temperature is controlled to be no more than 350 Celsius so as to be capable of being preventing the tempered glass plate from being annealed in braze welding process.

The braze welding process can carried out under the protection of inert gases, or carried out in the environment of $H_2$ gas or $N_2$ gas, or carried out in vacuum environment, thereby being beneficial to improving the welding quality of braze welding.

The metal sealing sheet 7 is in welding connection with the metallized layer 6 by metal brazing technology, thus the metal sealing sheet 7 and the metallized layer 6 are made of metal material suitable for braze welding.

The metal brazing technology can use proper heating methods such as induction heating, laser heating, microwave heating, and the like.

Specially, the sealing part of the vacuum glass component is positioned at the periphery of the glass plate and is in the shape of a sealed ring, thus the space between the two glass plates in the sealing part is vacuumized to prepare the tempered vacuum glass. In order to vacuumize between the top and the bottom glass plates, bleed holes are preset on the top or bottom glass plate and then vacuumizing is carried out after the braze welding of the metallized layer, and also the connection of the top and the bottom glass plates and the braze welding for the metallized layer are realized in the vacuum room.

Since the vacuum glass component needs the metallized layer sintered on the surface of the glass plate, and the metallized layer on the two glass plates are welded together with the metal sealing sheet 7 so as to realize the hermetic sealing at the edges of the two glass plates; moreover, in order to guarantee the safety use of the vacuum glass product, the tempering or semi-tempering or heat strengthening to the glass plate is required after the metallized layer is sintered; therefore, in order to guarantee enough bonding strength between the metallized layer and the glass plate and ensure that the metallized layer and the metal sealing sheet can be reliably welded together, the metallization paste used should have excellent characteristic of high temperature resistance, wherein the metal material contained should have excellent weldability, and the metallization paste meeting such requirement is of high temperature sintering type and the sintering temperature is 560-700 Celsius, comprising: Ag metallization paste, Cu—Ag alloy metallization paste, Ni metallization paste, Ni—Ag alloy metallization paste, Au and alloy metallization paste thereof, Zn and alloy metallization paste thereof or Pd and alloy metallization paste thereof, and the like.

When selecting the high temperature sintering type metallization paste in which the sintering temperature is within the range of tempering temperature of glass plate, the tempering treatment of the glass plate can be finished directly after quick cooling.

Of course, the glass plate after cooled can be heated again till tempering temperature after the sintering technology is finished, and then quick cooling is carried out to finish the tempering treatment of the glass plate.

Similarly, when the semi-tempering or heat strengthening composite glass is manufactured, the semi-tempering or heat strengthening of the glass plate can be finished directly by cooling after the sintering technology is finished, and the glass plate also can be heated and cooled according to the prior art after the sintering technology so as to finish the semi-tempering or heat strengthening of the glass plate.

FIG. 2 is shown for the second embodiment of the invention, shown as the FIG. 2a and FIG. 2b, in the embodiment, the metallized layer 6 positioned at the sealing part of the top and the bottom glass plates is directly welded and connected in air-tight manner through metal braze welding technology.

Different from the first embodiment, there are bleed holes 9 made for vacuumizing on top glass plate of vacuum glass composite in embodiment 2.

The vacuum glass component in the above embodiment is a flat plate vacuum glass component and is formed by compounding two glass plates; and it should be noted as follows: the vacuum glass component also can be a curved vacuum glass component and also can be formed by compounding more than two glass plates.

These drawings only give some detailed descriptions of the invention, the descriptions and the drawings are not intended to limit the scope of the present invention. And any other embodiment based on the design principle of the invention is included in the protection scope of the invention, which is defined in the following claims.

The invention claimed is:

1. A vacuum glass component comprising:
   two glass plates;
   a sealing part;
   a seal gum;
   wherein peripheries of the two glass plates are sealed together through the sealing part in an air-tight manner;
   wherein a gap is formed between the outer side of the sealing part and edges of the two glass plates and wherein the sealing part is isolated from the outer environment by filling the gap with the seal gum;
   wherein the sealing part comprises two metallized layers that are brazed directly to each other and wherein each of the two metallized layers comprises a metallization paste coating that is directly sintered on the edge of a surface of each of the two glass plates, respectively; and
   wherein a space between the two glass plates at the inner side of the sealing part is vacuum pumped after the two metallized layers are brazed directly to each other.

2. The vacuum glass component of claim 1, wherein the metallization paste coating comprises a sintering temperature in the range of 560° C. to 700° C.

3. The vacuum glass component according to claim 1, wherein the metallization paste coating is prepared on the surface of each of the glass plates by dip coating, spray coating, screen printing, manual coating or mechanical coating.

4. The vacuum glass component according to claim 1, wherein the metallization paste coating comprises Ag metallization paste, Cu—Ag alloy metallization paste, Ni metallization paste, Ni—Ag alloy metallization paste, Au metallization paste, Au-alloy metallization paste, Zn metallization paste, Zn-alloy metallization paste, Pd metallization paste, or Pd-alloy metallization paste.

5. The vacuum glass component according to claim 1, wherein the two metallized layers are brazed directly to each other via a brazing metal foil that is inserted between the metallized layers, or via a brazing metal coating that is pre-plated on the surface of at least one of the two metallized layers.

6. The vacuum glass component according to claim 5, wherein the brazing metal foil and the brazing metal coating comprise tin alloy brazing filler metal.

7. The vacuum glass component according to claim 1, wherein the two metallized layers are brazed under the protection of inert gases, or in the environment of $H_2$ gas or $N_2$ gas, or in vacuum environment.

8. The vacuum glass component according to claim 1, wherein the two metallized layers are brazed by locally heating the sealing areas via laser heating, flame heating, current heating, induction heating or microwave heating.

9. The vacuum glass component according to claim 5, wherein the brazing metal foil or the brazing metal coating comprises a brazing temperature lower than or equal to 350° C.

10. The vacuum glass component according to claim 1, wherein the side edges of the vacuum glass component are parallel and level.

11. The vacuum glass component according to claim 1, wherein the vacuum glass component is a flat plate vacuum glass component or a curved vacuum glass component.

12. The vacuum glass component of claim 1, the space between the two glass plates at the inner side of the sealing part is vacuum pumped through a bleed hole formed on one of the two glass plates.

* * * * *